Patented Jan. 24, 1928.

1,657,380

UNITED STATES PATENT OFFICE.

KNUD ERSLEV, OF NIJMEGEN, NETHERLANDS.

PROCESS OF PREPARING FATS OF A PLASTIC AND LITHE CONSISTENCY.

No Drawing. Application filed August 27, 1926, Serial No. 132,040, and in the Netherlands May 9, 1924.

The naturally occurring fats may be classified with regard to their consistency in two large groups viz, firstly those possessing a certain plastic and pliable consistency which fats are for that reason soft and moldable, secondly those lacking in pliability and possessing a hard, brittle consistency as for example cocoanut fat and palm kernel fat, and artificially hardened oils and fats.

The fats belonging to the first mentioned group are amongst others particularly adapted for preparing fatty products of which a certain softness and pliability is required. The fats belonging to the second group up to now could only be used for preparing such fatty products if their brittleness was reduced by addition of liquid oils. However, by the addition of said liquid oils the fats lose not only their brittleness but also partially their solidity as well, whereas their melting points are also lowered, so that they are no more suitable for preparing all such fatty products of which a somewhat stiff consistency is required.

Now it is found that this drawback may be removed and the fats of the said group may be made suitable for the preparation of all kinds of fatty products of which a non-brittle consistency is required, by influencing the crystallization of said fats by the addition of plasticizing substances, such as unvulcanized rubber, rubber latex and the like. Even a very small addition, for example, one-half of one per cent of one of the substances to the fats of said group has so great an effect as regards their crystallization as to materially reduce their brittleness. According to the object one has in view with the said fats, however, a greater percentage may be added.

To attain the purpose of the invention, unvulcanized rubber substances may be used which are not soluble in fats. To attain the purpose of the invention the rubber may be dissolved in a suitable solvent such as ether, carbondisulfide, and the like, and the solution added to the molten fat. The solvent may be reclaimed by evaporation and subsequent condensation, the rubber remaining in the fatty mass.

Example: 1,000 kg. of raw or refined palm kernel fat are thoroughly mixed with a solution of 5 kg. of rubber in 100 kg. of carbon disulphide. The solvent is subsequently removed by evaporation.

Claims:

1. The process for modifying hard brittle fats for reducing their brittleness comprising mixing with the fat while in molten state a solution of rubber in a volatile solvent, the proportion of rubber being approximately one-half per cent of the fat, and evaporating the solvent from the mixture.

2. In the process for modifying hard brittle fats for reducing their brittleness the step comprising mixing with the fat while in molten state a solution of rubber, the proportion of rubber being approximately one-half per cent of the quantity of fat.

In testimony whereof I affix my signature.

KNUD ERSLEV.